(12) United States Patent
Takano et al.

(10) Patent No.: US 9,235,011 B2
(45) Date of Patent: Jan. 12, 2016

(54) OPTICAL AND ELECTRICAL MIXED FLEXIBLE PRINTED WIRING BOARD AND METHOD OF MOUNTING LIGHT RECEIVING/EMITTING DEVICE THEREOF

(75) Inventors: Shoji Takano, Minato-Ku (JP); Fumihiko Matsuda, Minato-Ku (JP)

(73) Assignee: Nippon Mektron, Ltd., Minato-Ku (JP)

( * ) Notice: Subject to any disclaimer, the term of this patent is extended or adjusted under 35 U.S.C. 154(b) by 387 days.

(21) Appl. No.: 13/566,145

(22) Filed: Aug. 3, 2012

(65) Prior Publication Data

US 2013/0032703 A1 Feb. 7, 2013

(30) Foreign Application Priority Data

Aug. 5, 2011 (JP) .................................. 2011-172163

(51) Int. Cl.
*G02B 6/42* (2006.01)
*G02B 6/43* (2006.01)
*G02B 6/10* (2006.01)

(52) U.S. Cl.
CPC .. *G02B 6/42* (2013.01); *G02B 6/10* (2013.01); *G02B 6/4245* (2013.01); *G02B 6/43* (2013.01); *G02B 6/424* (2013.01); *G02B 6/4214* (2013.01); *Y10T 29/49133* (2015.01)

(58) Field of Classification Search
CPC .... G02B 6/424; G02B 6/4243; G02B 6/4245; G02B 6/10; G02B 6/43; H05K 3/30
USPC .................. 250/221, 559.33, 227.11, 227.14, 250/227.29, 214.1, 239; 385/14, 40, 129
See application file for complete search history.

(56) References Cited

U.S. PATENT DOCUMENTS

| | | | |
|---|---|---|---|
| 8,113,724 B2 | 2/2012 | Terada et al. | |
| 8,588,558 B2 * | 11/2013 | Vernooy et al. | 385/14 |
| 8,611,704 B2 * | 12/2013 | Yasuda et al. | 385/14 |
| 2004/0001661 A1 | 1/2004 | Iwaki et al. | |

(Continued)

FOREIGN PATENT DOCUMENTS

| | | |
|---|---|---|
| CN | 101872760 A | 10/2010 |
| CN | 102109646 A | 6/2011 |

(Continued)

OTHER PUBLICATIONS

Japanese Office Action dated May 26, 2015 (Application No. 2011-172163) (with English translation).

(Continued)

*Primary Examiner* — Georgia Y Epps
*Assistant Examiner* — Don Williams

(57) ABSTRACT

A light emitting device and a light receiving device are in a bare chip form and are a light emitting device of surface emitting type and a light receiving device of surface receiving type having an electrode on an opposite surface of a light emitting portion and a light receiving portion respectively, the light emitting device, the light receiving device, and an optical waveguide are mounted on one surface of a flexible printed wiring board body, the light emitting portion of the light emitting device, an optical waveguide core, and the light receiving portion of the light receiving device are arranged substantially coaxially, and the light emitting device and the light receiving device are mounted in such a way that a light emitting/receiving direction is substantially 90° with respect to an orthogonal direction of a surface of the flexible printed wiring board body.

4 Claims, 5 Drawing Sheets

(56) References Cited

U.S. PATENT DOCUMENTS

| | | | |
|---|---|---|---|
| 2008/0152286 A1* | 6/2008 | Ueno et al. | 385/101 |
| 2010/0014803 A1 | 1/2010 | Kodama et al. | |
| 2010/0061684 A1 | 3/2010 | Terada et al. | |
| 2010/0074575 A1 | 3/2010 | Hamada | |
| 2010/0119191 A1 | 5/2010 | Shibata et al. | |
| 2010/0142881 A1 | 6/2010 | Vernooy et al. | |
| 2010/0272388 A1 | 10/2010 | Im et al. | |
| 2010/0316335 A1 | 12/2010 | Furuyama | |
| 2013/0345863 A1* | 12/2013 | Linder et al. | 700/246 |

FOREIGN PATENT DOCUMENTS

| | | |
|---|---|---|
| JP | 2631287 B2 | 7/1997 |
| JP | 10-294496 A1 | 11/1998 |
| JP | 2004-086185 A1 | 3/2004 |
| JP | 2008-010837 A1 | 1/2008 |
| JP | 2009-058923 A1 | 3/2009 |
| JP | 2010-026508 A1 | 2/2010 |
| JP | 2010-097198 A1 | 4/2010 |
| JP | 2010-286777 A1 | 12/2010 |

OTHER PUBLICATIONS

Chinese Office Action (Application No. 201210276176.0) dated Mar. 17, 2015 (with English translation).

Japanese Office Action (Application No. 2011-172163) dated Aug. 11, 2015 (with English translation).

* cited by examiner

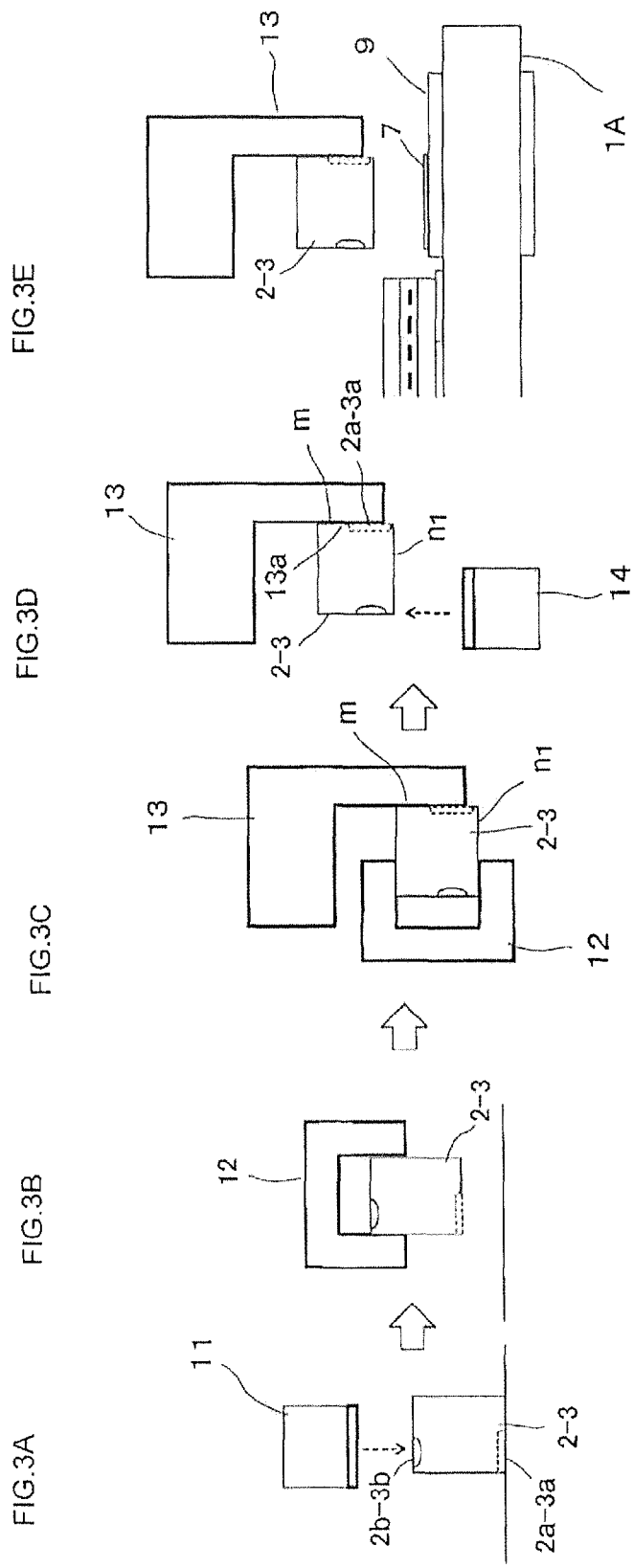

US 9,235,011 B2

OPTICAL AND ELECTRICAL MIXED FLEXIBLE PRINTED WIRING BOARD AND METHOD OF MOUNTING LIGHT RECEIVING/EMITTING DEVICE THEREOF

BACKGROUND OF THE INVENTION

1. Field of the Invention

The present invention relates to an optical and electrical mixed flexible printed wiring board including an optical waveguide having flexibility and a method of mounting a light receiving/emitting device thereof.

2. Description of the Related Art

In recent years, miniaturization and higher performance of electronic devices are increasingly promoted and demands for ever-denser circuit boards are growing. Thus, circuit boards are made denser by converting a single-sided circuit board into a double-sided circuit board or multi-layer circuit board having at least three layers.

As part thereof, a hybrid multilayer circuit board as described, for example, in Japanese Patent No. 2631287 (Page 4, FIG. 5) is widely used mainly in small electronic devices such as notebook computers, digital cameras, mobile phones, and game machines. The hybrid multilayer circuit board has a configuration in which multilayer circuit boards or hard circuit boards on which various electronic components are mounted are connected by a flexible cable portion integrating a separate flexible printed wiring board or a flexible flat cable via a connector or the like.

Particularly, the amount of information of these devices is increasing and the signal transmission speed at which such information is transmitted tends to become increasingly faster. The transmission speed of personal computers has shifted to the transmission standard of 6 Gbps in 2010 to 2011 and it is becoming increasingly important to take transmission losses in lines into consideration.

Further, to transmit a pulse signal at high speed, the signal amplitude voltage of a signal source tends to become lower, making correct signal transmission more vulnerable to spike noise originating externally or internally. A board performing high-speed signal transmission needs a characteristic impedance matched transmission line, which makes transmission losses less tolerable.

It is necessary to take noise resistance measures of transmission lines and inside devices against the above spike noise and a shield needs to be formed for the transmission lines. Thus, the transmission line becomes thicker and it may be difficult to ensure flexibility of a hinge connecting the display of a notebook computer or the like and the keyboard. Accordingly, the application of high-speed signal transmission by an optical signal using an optical fiber commercially used in the field of long-distance transmission is examined for small devices to solve problems of losses and noise resistance to transmit an electric signal at high speed.

Further, a transmission line combining an organic polymeric optical waveguide having flexibility with a flexible printed wiring board to be able to apply to the above hinge portion or the like is described in Japanese Patent Application Laid-Open No. 2009-58923 (Page 17, FIG. 11) and Japanese Patent Application Laid-Open No. 2010-286777 (Page 13, FIG. 5).

However, a transmission line combining a flexible printed wiring board made of a resin material of low elastic modulus and heat resistance and a polymeric optical waveguide is subject to tight constraints of the method and conditions for mounting an optical device that emits or receives light. It is also necessary to align each member, to form a 45° mirror to the polymeric optical waveguide, and to protect the optical path and mirror surface and thus, complex processes are needed and it is structurally difficult to manufacture the transmission line with high yields at low cost.

From the above, a structure that enables the manufacture of an optical and electrical mixed flexible printed wiring board including an optical waveguide at low cost with stability is desired.

FIGS. 4A to 4E are structural sectional views schematically showing a conventional an optical and electrical mixed flexible printed wiring board including an optical waveguide described in Japanese Patent Application Laid-Open No. 2010-286777.

That is, a light emitting device 102 including an electrode portion 102a and a light emitting portion 102b and a light receiving device 103 including an electrode portion 103a and a light receiving portion 103b are mounted on one surface of a flexible printed wiring board 101 at predetermined intervals.

The flexible printed wiring board 101 is provided with optical path holes 104, 104 drilled toward the rear surface separately corresponding to the light emitting portion 102b and the light receiving portion 103b and a polymeric optical waveguide 105 having flexibility is pasted to the opposite surface of the double-sided flexible printed wiring board 101 via an adhesive 106.

A mirror portion 107 is formed on an extension line of a core 105a of the optical waveguide 105. A relatively cheap VCSEL (Vertical Cavity Surface Emitting LASER [emitting light in a direction perpendicular to the semiconductor wafer substrate]) is used as the light emitting device 102 and a photo diode having sensitivity at wavelength 850 nm is used as the light receiving device 103 by fitting to the wavelength 850 nm of VCSEL.

The electrode portions 102a, 103a of the light emitting device 102 and the light receiving device 103 are provided on the side of the light emitting portion 102b and the light receiving portion 103b respectively and are mounted on the flexible printed wiring board 101 by the flip chip bonding method by using a solder bump 109.

The light emitting device 102 and the light receiving device 103 are mounted, as shown in FIGS. 4B to 4E, according to the following procedure. The mounting procedure is the same for the light emitting device 102 and the light receiving device 103 and thus, the light emitting device 102 and the light receiving device 103 are denoted as a light emitting/receiving device 123 below.

i) The light emitting/receiving device 123 is recognized by a camera 111 such as a CCD before pickup (see FIG. 4B).
ii) Two opposed side faces of the light emitting/receiving device 123 are picked up by a pickup tool 112 to move from a tray stocking the light emitting/receiving device 123 into a mounting apparatus (here, a flip chip bonder) (see FIG. 4C).
iii) The pickup tool 112 reversely rotates by 180° so that the light emitting/receiving device 123 is passed to a suction nozzle 113 for mounting (see FIG. 4D).
iv) The light emitting/receiving device 123 is sucked by the suction nozzle 113, recognized by a camera 114 (see FIG. 4E), and moved to a mounting stage before being mounted on a board.

It is necessary to protect the lower space of the light emitting device 102 and the light receiving device 103, the inside of the optical path hole 104, and the mirror portion 107 and each is sealed by using a transparent sealing resin 108. If the refractive index of the sealing resin 108b is high, the mirror portion 107 does not function as a mirror and thus, it is also necessary to form a metallic thin film by the sputter process, the evaporation method or the like in the mirror portion 107. Both of the flexible printed wiring board 101 and the optical waveguide 105 have flexibility and so can be bent.

In the conventional structure, the optical axes of the light emitting portion 102b, the optical path hole 104 on the side of the light emitting device 102, the mirror portion 107, the optical waveguide 105, the optical path hole 104 on the side of the light receiving device 103, and the light receiving portion 103b need to be with accuracy up to 30 to 50 μm to be able to transmit an optical signal with stability and it is very difficult to attain such accuracy when a flexible printed wiring board whose dimensions are likely to expand or contract is used.

In addition, optical transmission losses increase in the resin portion sealed in the lower space of the light emitting/receiving device 123 and inside the optical path hole 104 and thus, it is necessary to increase power applied to the light emitting device 102 for signal transmission, which is disadvantageous from the viewpoint of decreasing power consumption.

In contrast, Japanese Patent Application Laid-Open No. 2010-26508 (Page 16, FIG. 1) describes an optical transmission module that does not form a mirror in an optical waveguide, but problems are posed in the following points.

FIG. 5A is a structural sectional view showing the structure of an optical transmission module that does not form a mirror in a conventional optical waveguide described in Japanese Patent Application Laid-Open No. 2010-26508.

A light emitting device 202 and a light receiving device 203 are of end face entry/emission type, which is more expensive than a light emitting device of surface emitting type such as VCSEL. Also in this case, a solder bump 209 is used for mounting and it is difficult to attain accuracy of position in the direction of bump height with respect to an optical waveguide 205. If estimated conservatively, the position fluctuates in units of 10 μm. The method of ensuring the accuracy of position in the XY directions is described, no description is found regarding the Z direction.

As the method of ensuring the accuracy of position in the XY directions, cutting the position of the optical waveguide 205 in the XY directions by laser after the light emitting device 202 and the light receiving device 203 are mounted is described. According to this method, because the shape of the sidewall of the optical waveguide 205 is not good, which increases losses, and the processing accuracy of position by laser is at least a few μm or more, losses are also caused here. In addition, the process is complex.

Further, Japanese Patent Application Laid-Open No. 2008-10837 (Page 18, FIG. 6) describes an optical transmission module that uses a light emitting device of surface emitting type and does not form a mirror in an optical waveguide, but problems are posed in the following points.

FIG. 5B is a structural sectional view schematically showing the structure of an optical transmission module that uses a light emitting device 302 and a light receiving device 303 of conventional surface emitting type described in Japanese Patent Application Laid-Open No. 2008-10837 and does not form a mirror in an optical waveguide 305 and FIG. 5C is an enlarged view of a light emitting device mounting portion.

The light emitting device 302 and the light receiving device 303 use devices of surface emitting type and surface receiving type and the device is connected to a sub-mount board 309 and when the sub-mount board 309 is mounted on a base 310, an optical axis L is adjusted to be directed in the horizontal direction.

There are three pending problems with this approach.

The substantial thickness of a light emitting portion 302b and a light receiving portion 303b is made thicker by using the sub-mount board 309, making it difficult to make the thickness as an optical transmission module thinner.

When connecting the light emitting device 302 and the light receiving device 303 to the sub-mount board 309, it is recommended not to use sealing of resin at this point for convenience in subsequent processes, though at least one of two electrodes is connected by wire bonding 308. If the recommendation is followed, however, the wire 308 may be broken before the sub-mount board 309 is mounted on the base 310 and sealed, which is not preferable.

When connecting the light emitting/receiving devices 302, 303 to the sub-mount board 309, at least one of two electrodes in each device is connected by wire bonding and thus, the distance between the light emitting/receiving portions 302b, 303b and the end face of the optical waveguide 305 increases by the loop of the wire 308 and transmission losses are also caused here, which is disadvantageous from the viewpoint of decreasing power consumption.

Because the accuracy of the optical axis L of the light emitting device 302 and the light receiving device 303 changes depending on mechanical accuracy of the end face of the sub-mount board 309, it is necessary to work on the outer shape of the sub-mount board 309 with high accuracy, increasing the cost of producing the sub-mount board 309.

When a sealing medium 307 is used for fixing, the optical axis L of the light emitting device 302, the light receiving device 303, and the optical waveguide 305 connected to the sub-mount board 309 is aligned and then fixed by the sealing medium 307 at a time and there are two pending problems with this approach.

First, it is disclosed that the alignment may be active or passive, if active alignment should be performed in the configuration, it is necessary to pass a current while the wire 308 is exposed on the sub-mount board 309 and there is still the possibility of breaking of the wire 308 and alignment is considered to be practically difficult.

For passive alignment, the optical axis L needs to be fitted to the predetermined alignment and targets and if an alignment mark is created on the optical device side, recognition from the direction of the optical axis L is needed, which is difficult to implement. For alignment from the surface direction, it is difficult to define the height of the light emitting portion 302b and the light receiving portion 303b of the light emitting device 302 and the light receiving device 303 and the height of the optical waveguide 305. From the above, it is necessary to allow for a certain level of position deviations, which is disadvantageous from the viewpoint of decreasing power consumption.

The method is considered to be valid only if, after the optical axis L being aligned, sealing is done at a time while the optical axis L is held, but how to temporarily fix the sub-mount board 309 and the optical waveguide 305 is not sufficiently described and no description of addition of an adhesive layer is found, which makes the implementation thereof difficult.

Thus, replacing a light emitting device and a light receiving device of an optical transmission module like Japanese Patent Application Laid-Open No. 2010-26508 and Japanese Patent Application Laid-Open No. 2008-10837 in which no mirror is formed by a device having electrodes on the surface opposite to the light emitting/receiving portion can be considered, but no suitable small device is found, making it difficult to realize a thin optical transmission module.

For example, an LED package as described in Japanese Patent Application Laid-Open No. 10-294496 (Page 3, FIG. 1) is available, but even a small-sized package has large dimensions of the length 1.6 mm×width 0.8 mm×thickness 0.25 mm and the thickness of an optical transmission module mounted with the package becomes 0.8 mm so that the optical transmission module cannot be made thin and small.

SUMMARY OF THE INVENTION

The present invention provides an optical and electrical mixed flexible printed wiring board capable of aligning light emitting/receiving devices and an optical waveguide and sealing an optical path easily and which can be made as thin as possible and a light emitting/receiving device mounting method thereof.

According to a first aspect of the present invention, there is provided an optical and electrical mixed flexible printed wiring board, including: a flexible printed wiring board body having at least one layer of a conductive layer and a flexible insulating layer and an optical waveguide bonded to the flexible printed wiring board body via an adhesive, wherein the optical waveguide includes at least one flexible optical waveguide core having at least two optical input/output portions and a flexible optical waveguide cladding at least in contact with the optical waveguide core, a light emitting device and a light receiving device are mounted on the flexible printed wiring board body and light from a light emitting portion of the light emitting device is transmitted to a light receiving portion through the optical waveguide, the light emitting device and the light receiving device are in a bare chip form and are a light emitting device of surface emitting type and a light receiving device of surface receiving type having an electrode on an opposite surface of the light emitting portion and the light receiving portion respectively, and the light emitting device, the light receiving device, and the optical waveguide are mounted on one surface of the flexible printed wiring board body, the light emitting portion of the light emitting device, the optical waveguide core, and the light receiving portion of the light receiving device are arranged substantially coaxially, and the light emitting device and the light receiving device are mounted in such a way that a light emitting/receiving direction is substantially 90° with respect to an orthogonal direction of a surface of the flexible printed wiring board body.

It is desirable that each electrode of the light emitting device and the light receiving device be arranged closer to a fixed surface side of the light emitting device and the light receiving device to be a bottom side when mounted on the flexible printed wiring board body.

It is desirable that the light emitting portion of the light emitting device and a light input portion of the optical waveguide, and the light receiving portion of the light receiving device and a light output portion of the optical waveguide be each sealed by an integral sealing resin.

According to a second aspect of the present invention, there is provided a method of mounting a light emitting device and a light receiving device on the optical and electrical mixed flexible printed wiring board, including: if the light emitting device and the light receiving device are denoted as a light emitting/receiving device and a light emitting portion and a light receiving portion of the light emitting device and the light receiving device are denoted as a light emitting/receiving portion of the light emitting/receiving device, recognizing the light emitting/receiving device to be picked up by a first camera from many light emitting/receiving devices placed with the light emitting/receiving portion being directed upward; gripping two opposed end faces of four end faces at right angles to a light emitting/receiving surface on which the light emitting/receiving portion is provided of the recognized light emitting/receiving device to be picked up by a pickup tool and moving the light emitting/receiving device into a mounting apparatus; rotating the pickup tool by 90°, sucking and holding a surface on an opposite side of the light emitting/receiving surface of the rotated light emitting/receiving device by a suction unit, directing a light emitting/receiving direction of the light emitting/receiving portion in a horizontal direction, and directing a bottom fixed surface of the four end faces of the light emitting/receiving device downward while the bottom fixed surface protruding from a suction holding portion of the suction unit; and recognizing an outer shape of the light emitting/receiving device sucked and held by the suction unit by a second camera, moving the light emitting/receiving device to a mounting stage, and mounting the light emitting/receiving device by fixing a fixing surface to a flexible printed wiring board body in such a way that the light emitting/receiving direction is substantially 90° with respect to an orthogonal direction of a surface of the flexible printed wiring board body.

According to the present invention, a light emitting device, an optical waveguide, and a light receiving device are mounted on one surface of a flexible printed wiring board and a light emitting portion of the light emitting device, an optical waveguide core, and a light receiving portion of the light receiving device are arranged substantially coaxially and therefore, the distance from the light emitting portion of the light emitting device to the end face as an input/output portion of the optical waveguide core and the distance from the light receiving portion of the light receiving device to the end face of the optical waveguide core can be set to be short and a structure with less optical transmission losses and high transmission efficiency is created so that power consumption can be reduced.

By mounting light emitting/receiving devices of surface direction type on a flexible printed wiring board body in such a way that the light emitting/receiving direction is substantially 90° with respect to an orthogonal direction of the flexible printed wiring board body surface (direction parallel to the flexible printed wiring board body), it becomes possible to apply a cheap light emitting device of surface emitting type and a cheap light receiving device of surface receiving type so that member costs can be reduced.

Further, a light emitting device and a light receiving device in a bare chip state are directly mounted on a flexible printed wiring board body and therefore, the overall thickness can be made thinner.

From the foregoing, an optical and electrical mixed flexible printed wiring board that makes alignment of a light emitting device and a light receiving device with an optical waveguide and sealing of an optical path easy and has the optical waveguide capable of reducing power consumption can be provided at low cost with stability.

BRIEF DESCRIPTION OF THE DRAWINGS

FIGS. 3A to 3E are conceptual sectional process drawings showing a method of mounting the light emitting/receiving device in FIGS. 2A to 2F;

DETAILED DESCRIPTION OF THE INVENTION

The present invention will be described with reference to the illustrated embodiments.

Figure 1A:
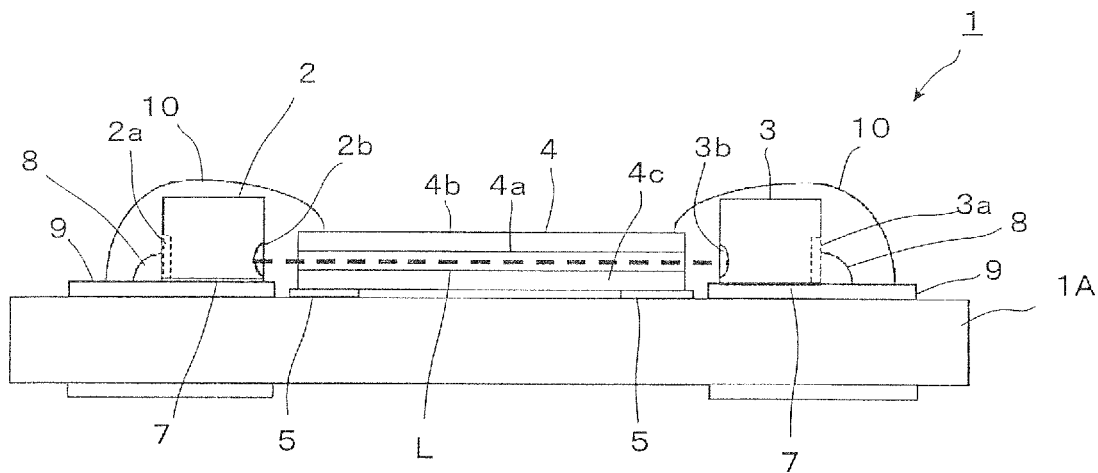
FIGS. 1A and 1B show a conceptual configuration of an optical and electrical mixed flexible printed wiring board including an optical waveguide according to an embodiment of the present invention and FIG. 1A is a sectional view showing other portions than the flexible printed wiring board body as a section and FIG. 1B is a top view thereof.
Figure 1B:
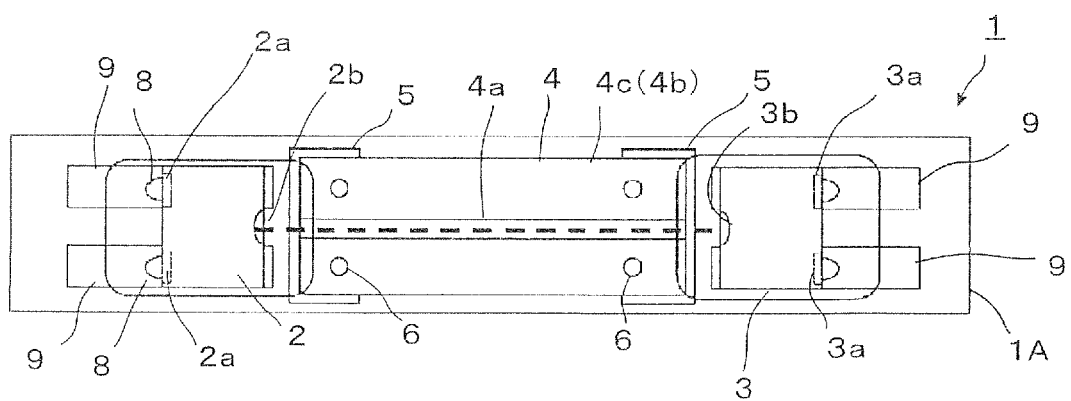

FIGS. 1A and 1B show structural drawings of an optical and electrical mixed flexible printed wiring board including an optical waveguide according to an embodiment of the present invention and FIG. 1A is a sectional view showing other portions than the flexible printed wiring board body as a section and FIG. 1B is a top view thereof.

An optical and electrical mixed flexible printed wiring board 1 includes a flexible printed wiring board body 1A, an optical waveguide 4 bonded to the flexible printed wiring board body 1A via an adhesive 5, and a light emitting device 2 and a light receiving device 3 in a bare chip state mounted on the flexible printed wiring board body 1A.

The flexible printed wiring board body 1A has, though not illustrated, a normal configuration having at least one conductive layer and a flexible insulating layer.

The light emitting device 2, the light receiving device 3, and the optical waveguide 4 are mounted on one surface of the flexible printed wiring board 1 and a light emitting portion 2b of the light emitting device 2, an optical waveguide core 4a, and a light receiving portion 3b of the light receiving device 3 are arranged substantially coaxially. The light emitting device 2 and the light receiving device 3 are a device of surface emitting type and of surface receiving type respectively and are mounted in such a way that the light emitting/receiving direction is substantially 90° with respect to the orthogonal direction of the flexible printed wiring board 1, in other words, the light emitting/receiving direction is parallel to the flexible printed wiring board 1.

That is, the light emitting device 2 and the light receiving device 3 are separated by a predetermined distance on the flexible printed wiring board body 1A and the light emitting portion 2b and the light receiving portion 3b are mounted opposite to each other and the polymeric optical waveguide 4 is pasted therebetween via the adhesive 5.

The light emitting device 2 and the light receiving device 3 are fixed to a device mounting portion 9 of the flexible printed wiring board body 1A by an insulating adhesive layer 7 such as DAF (die attachment film) and electrodes 2a, 3a of each device are electrically connected to the device mounting portion 9 via an electric connection portion 8 by wire bonding.

The light emitting device 2, the light receiving device 3, and the input/output portion of the optical waveguide 4 including the electric connection portion 8 are each sealed by a transparent sealing resin 10.

(Configuration of the Optical Waveguide)

The optical waveguide 4 is made of polymer and includes the core portion 4a as at least one flexible optical waveguide core having at least two optical input/output portions and clad portions 4b, 4c as upper and lower flexible optical waveguide claddings in contact with at least the core portion 4a.

The optical waveguide 4 made of polymer is highly transparent, uses a soft acryl resin or the like as a base resin, and includes the clad portions 4b, 4c with a relatively low refractive index and the core portion 4a with a high refractive index. In the present example, a core layer of a predetermined width is formed by pasting a film for the core portion 4a onto the lower clad portion 4c and using a photo fabrication method. When the core layer is formed, a target mark 6 for alignment with each device of the light emitting device 2 and the light receiving device 3 is also formed at the same time. The optical core portion 4a is 50 μm in both width and thickness.

As a method of producing the optical waveguide 4 made of polymer, the photo bleaching method capable producing a composite material having different refractive indexes from a single material only by exposure and heat treatment without development can be used. In such a case, a polymeric waveguide can be produced from a single material, which is advantageous in terms of cost.

The adhesive 5 used to bond the optical waveguide 4 to the flexible printed wiring board body 1A bonds only edges of the optical waveguide 4 and there is a space corresponding to the thickness of the adhesive 5 between the flexible printed wiring board body 1A and the optical waveguide 4. Thus, a stress applied to the center portion of the flexible printed wiring board body 1A and the optical waveguide 4 in FIGS. 1A and 1B when each is bent can be reduced, leading to a structure superior in flexibility.

The method of aligning the optical axis L with stability will be described later. In the optical and electrical mixed flexible printed wiring board 1 in the present invention, the distance between the light emitting portion 2b of the light emitting device 2 and the end face of the optical waveguide 4 and the distance between the light receiving portion 3b of the light receiving device 3 and the end face of the optical waveguide 4 are short and these devices can be arranged within 50 μm, creating a structure with less optical transmission losses and high transmission efficiency.

The refractive index of the sealing resin 10 is between the refractive index of the core portion and that of the clad portion.

(Configuration of the Light Emitting Device and Light Receiving Device)

Next, the configuration of the light emitting device and light receiving device will be described with reference to FIGS. 2A to 2F.

The light emitting device 2 and the light receiving device 3 have the same structure in that both devices form bare chips diced into a quadrangular shape and having the same dimensions and the electrodes 2a, 3a are provided on the surface on the opposite side of the light emitting portion 2b and the light receiving portion 3b. Thus, the light emitting device 2 and the light receiving device 3 are together denoted as a light emitting/receiving device 2-3, the electrodes 2a, 3a are denoted as electrodes 2a-3a of the light emitting/receiving device 2-3, and the light emitting portion 2b and the light receiving portion 3b of the light emitting device 2 and the light receiving device 3 are together denoted as a light emitting/receiving portion 2b-3b.

Figure 2A:
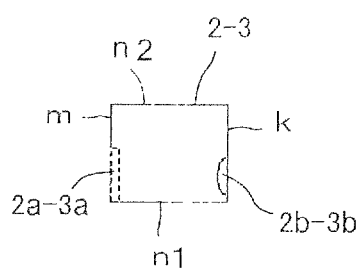
FIGS. 2A to 2F are conceptual block diagrams showing a common configuration of a light emitting device and a light receiving device in FIGS. 1A and 1B as a light emitting/receiving device.
Figure 2B:
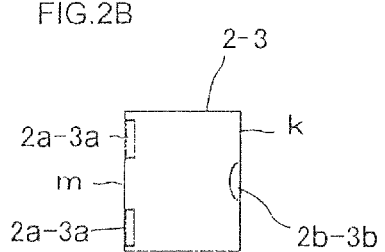

In FIGS. 2A to 2F, FIG. 2A is a sectional view of a light emitting/receiving device and FIG. 2B is a top view of the light emitting/receiving device.

The light emitting/receiving device 2-3 is a bare chip in a quadrangular plate shape and includes a light emitting/receiving surface k in a quadrangular shape on which the light emitting/receiving portion 2b-3b is provided, an electrode surface m in a quadrangular shape on the opposite side of the light emitting/receiving surface k and parallel to each other on which electrodes are provided, and four end faces at right angles to the light emitting/receiving surface k and the electrode surface m, and one of the four end faces becomes a bottom fixed surface n1 when mounted and the electrodes 2a-3a provided on the electrode surface m are provided closer to the side of the bottom fixed surface n1.

Figure 2C:
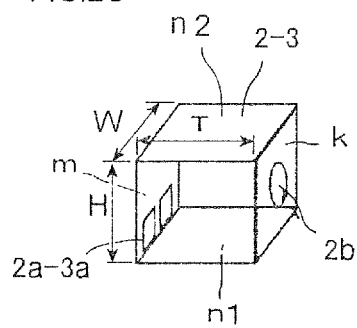

Because the bottom fixed surface n1 is mounted on the flexible printed wiring board body 1A, the ratio of a device height H and a device thickness T shown in FIG. 2C affects mounting properties. The device height H is a dimension between the bottom fixed surface n1 and a top edge surface n2 and the device thickness T is a dimension between the light emitting/receiving surface k and the electrode surface m. If the device height H is too high with respect to the device thickness T, the light emitting/receiving device 2-3 is more likely to peel from the board after mounting. Moreover, the mounting angle becomes less stable and thus, the optical axis (angle) is more likely to shift. W is the width of the device.

Figure 2D:
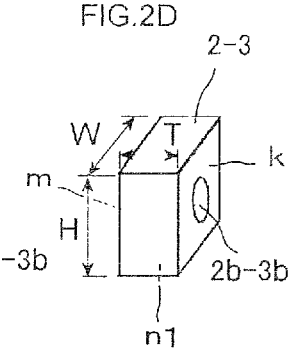
Figure 2E:
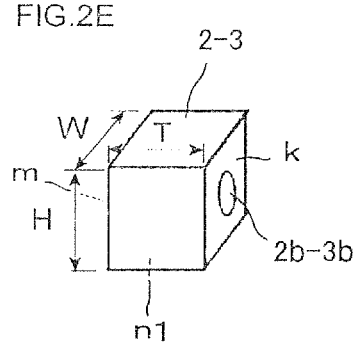

Thus, as shown in FIGS. 2C to 2E, if the device height H is set to 1, the device thickness T is set between the minimum 0.5 and the maximum 1. The device height H as a reference is about 0.2 mm to 0.35 mm. If the device thickness T is below the minimum 0.5, as described above, stability becomes a concern and if the device thickness T is above the maximum 1, there are concerns that forming a through hole when an electrode is formed leads to higher costs and an increased mounting area could obstruct higher densities. If such concerns are taken into consideration, the range of the suitable thickness ratio is set to 0.6 to 0.8. This corresponds to the device thickness 0.18 mm to 0.24 mm if the device height is 0.3 mm.

Figure 2F:
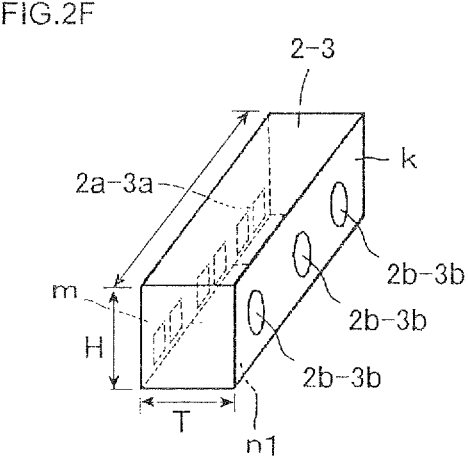
Figure 4A:
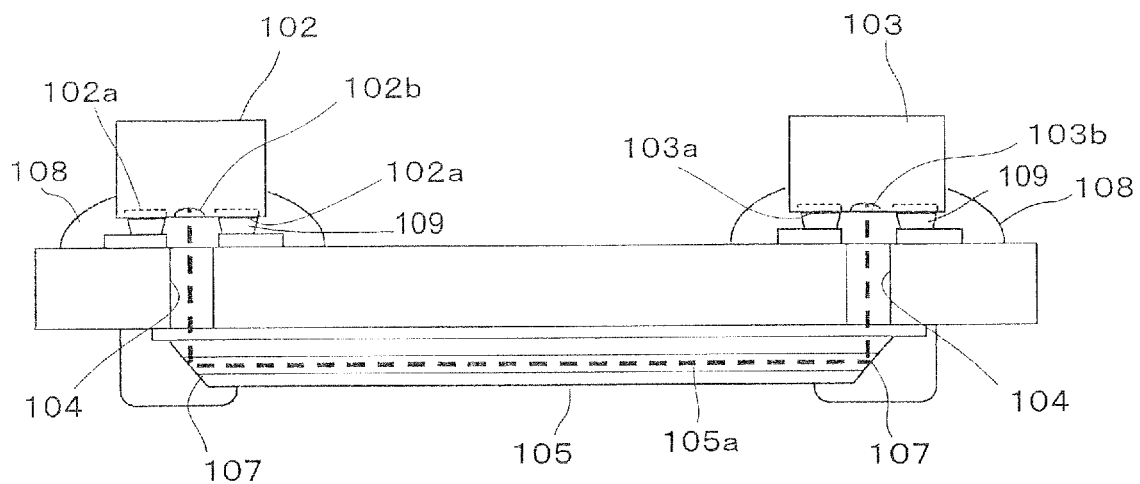
FIG. 4A is a conceptual sectional block diagram of the optical and electrical mixed flexible printed wiring board on which a conventional light emitting device/light receiving device and the optical waveguide are mounted and FIGS. 4B to 4E are conceptual sectional process drawings showing the method of mounting the conventional light emitting/receiving device.
Figures 4B, 4C, 4D, 4E:
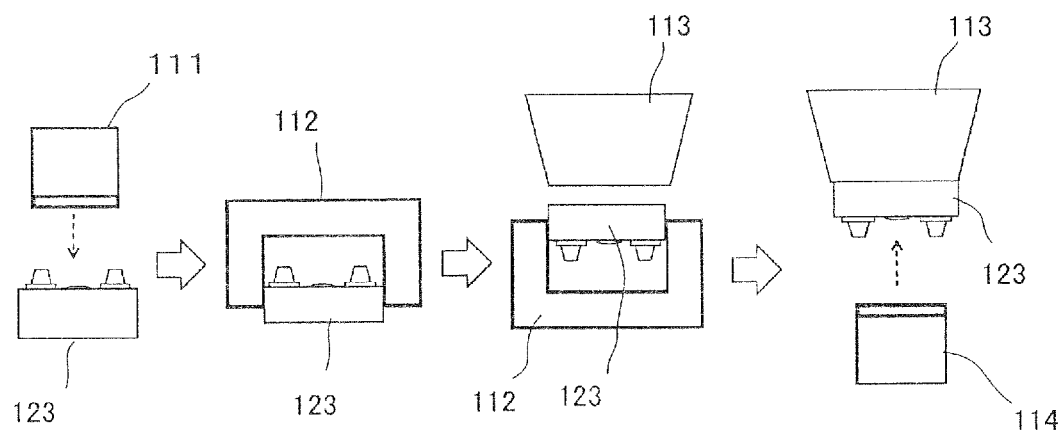
Figure 5A:
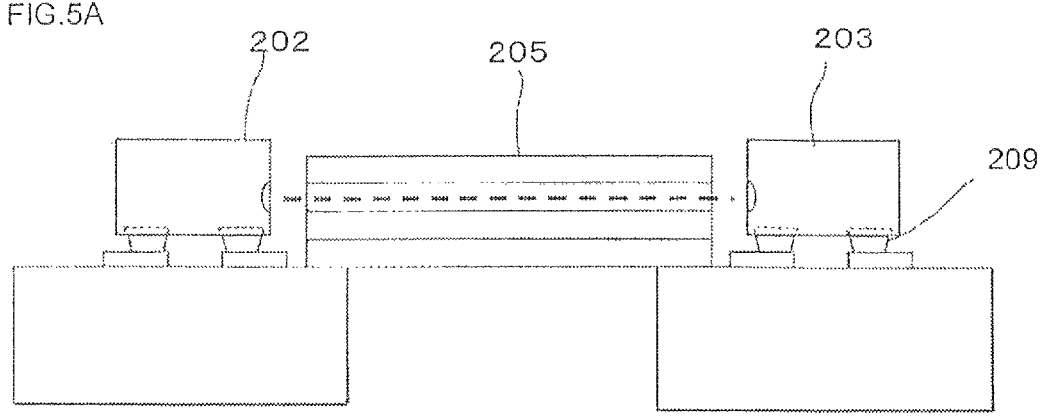
FIG. 5A is a conceptual sectional block diagram of another conventional optical and electrical mixed optical transmission module.
Figure 5B:
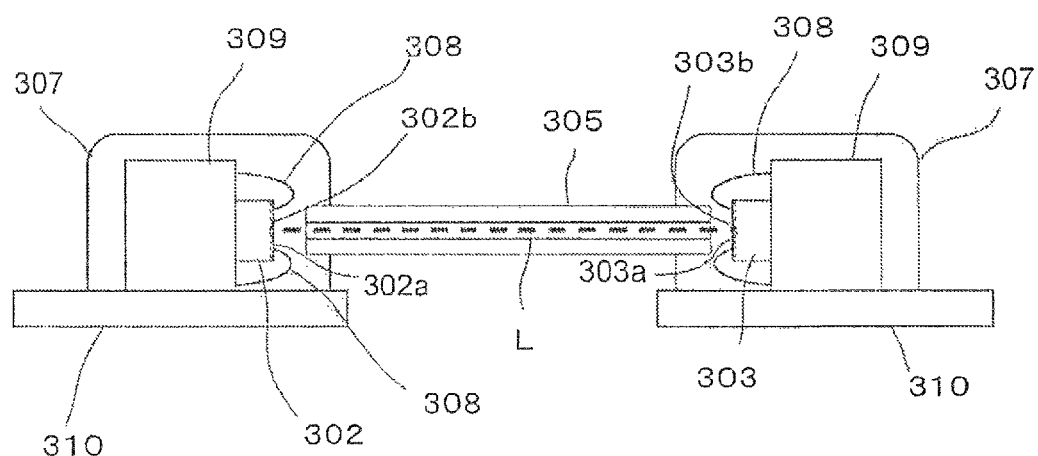
FIG. 5B is a conceptual sectional block diagram of still another conventional optical and electrical mixed optical transmission module.
Figure 5C:
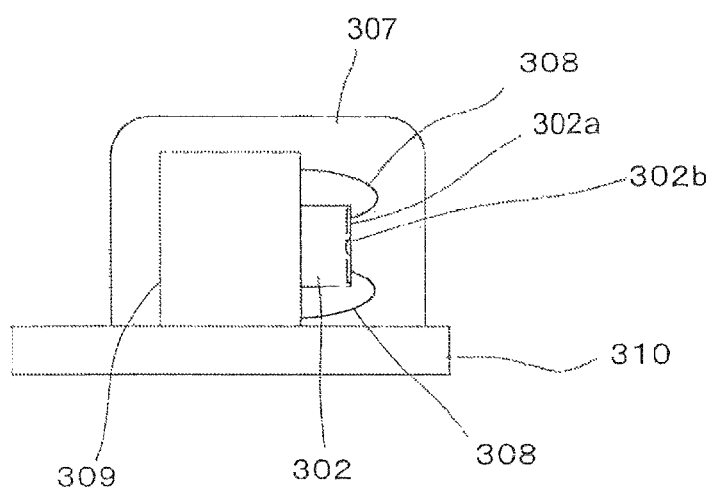
FIG. 5C is an enlarged view of a conventional light emitting device mounting portion.

As shown in FIG. 2F, the light emitting/receiving device 2-3 may have an array configuration in which a plurality of light emitting/receiving portions 2b-3b is provided in the width (W) direction. Also in this case, the relationship between the device height H and the device thickness T is the same.

The light emitting/receiving device 2-3 is fixed to the flexible printed wiring board body 1A by being fixed to the mounting portion 9 by the die attachment film 7 and the electric connection portion 8 is ball-bonded and thus, as shown in FIG. 2A, it is necessary to bring the electrodes 2a-3a closer to the side of the bottom fixed surface n1 when devices are mounted.

The arrangement place of the electrodes 2a-3a on the electrode surface m positioned on the opposite surface of the light emitting/receiving surface k can arbitrarily be set when the bare chip is produced. The size thereof is, though dependent on the size of the ball and the accuracy of position, about 50 to 100 µm.

(Procedure for Producing an Optical and Electrical Mixed Flexible Printed Wiring Board)

According to the procedure for producing an optical and electrical mixed flexible printed wiring board including an optical waveguide in the present invention, the flexible printed wiring board body 1A is first produced and then aligned with the optical waveguide 4 via the adhesive 5 to paste the optical waveguide 4.

At this point, the above target mark 6 for alignment with each device of the light emitting device 2 and the light receiving device 3 can be used as a target for alignment on the side of the optical waveguide 4. It is also possible to align with the outer shape of the optical waveguide 4, the core portion 4b and the like.

Then, the chip outline of the light emitting device 2 and the light receiving device 3 and the target mark 6 for alignment of the optical waveguide 4 are aligned in the surface direction (optical axis alignment) for mounting.

(Method of Mounting the Light Emitting/Receiving Device)

Next, the method of mounting the light emitting/receiving device 2-3 will be described with reference to FIGS. 3A to 3E.

i) Recognition by a First Camera 11 Such as a CCD Before pickup (see FIG. 3A)

The light emitting/receiving device 2-3 to be picked up is recognized by the first camera from among many light emitting/receiving devices placed in a diced state with the light emitting/receiving portion 2b-3b directed upward.

ii) Pickup of the Light Emitting/Receiving Device 2-3 (See FIG. 3B)

Two opposed side faces of the light emitting/receiving device 2-3 are gripped by a pickup tool 12 to move from a tray or dicing table before mounting into a mounting apparatus (here, a bonding apparatus for ball bonding).

iii) Passing to a Suction Nozzle 13 (See FIG. 3C)

The pickup tool 12 rotates by 90° to pass the light emitting/receiving device 2-3 to the suction nozzle 13 for mounting.

That is, the pickup tool 12 is rotated by 90°, the electrode surface m of the light emitting/receiving device 2-3 is sucked and held by the suction nozzle 13, the light emitting/receiving direction of the light emitting/receiving portion 2b-3b is directed in the horizontal direction, and also the bottom fixed surface n1 of the four end faces of the light emitting/receiving device 2-3 is directed downward while protruding from a nozzle tip 13a as a suction holding portion of the suction nozzle 13. By releasing the pickup tool 12 in this state, the light emitting/receiving device 2-3 is held by the nozzle 13.

The suction nozzle 13 can adsorb, but is not mounted with an ultrasonic horn for welding or the like and is specialized for aligning the light emitting/receiving device 2-3 with high accuracy. The bottom fixed surface n1 protruding from the nozzle tip 13a will be fixed to the flexible printed wiring board body 1A.

iv) Mounting

The light emitting/receiving device 2-3 is sucked by the suction nozzle 13, the outer shape of the light emitting/receiving device 2-3 is recognized by a second camera 14 (see FIG. 3D), and the light emitting/receiving device 2-3 is moved to a mounting stage before being mounted on the flexible printed wiring board body 1A (see FIG. 3E).

Accordingly, the light emitting/receiving device 2-3 is mounted in such a way that the light emitting/receiving direction is substantially 90° with respect to the orthogonal direction of the flexible printed wiring board body 1A, in other words, the light emitting/receiving direction of the light emitting/receiving device 2-3 is parallel to the flexible printed wiring board body 1A.

The light emitting/receiving device 2-3 is fixed onto the mounting portion 9 by the insulating adhesive layer 7 such as DAF (die attachment film) tape to electrically connect the electrodes 2a-3a of the light emitting/receiving device 2-3 by ball bonding using a gold wire (electric connection portion 8). The bonding method is not limited to wire bonding, but when compared with a case of solder bumps, the accuracy in the height direction is not affected.

v) Adjustment of the Optical Axis

First, to adjust the optical axis in the height direction, the height of the light emitting portion 2b and the light receiving portion 3b, thickness of the DAF tape of the adhesive layer 7, conductor thickness of the device mounting portion 9, thickness of the lower clad portion 4c, and thickness of the adhesive 5 are adjusted to align the optical axis in the height direction of the light emitting portion 2b and the light receiving portion 3b with the that of the core portion 4b of the optical waveguide 4.

On the other hand, for alignment in the surface direction (direction parallel to the surface of the flexible printed wiring board body 1A), the target mark 6 formed on the optical waveguide 4 is used for alignment.

vi) Sealing

Then, the end face of the core portion 4b of the optical waveguide 4, the light emitting portion 2b, and the light receiving portion 3b are sealed by using the transparent sealing resin 10 for protection and space sealing. Also for the sealing, it is only necessary to seal one location around the light emitting device 2 and the light receiving device 3 arranged on one side of the flexible printed wiring board body 1A, which is simple and easy.

From the foregoing, the optical and electrical mixed flexible printed wiring board 1 that makes alignment of the light emitting device 2 and the light receiving device 3 with the optical waveguide 4 and sealing of an optical path easy and has the optical waveguide capable of reducing power consumption can be obtained.

Incidentally, the flexible printed wiring board is not limited to a double-sided flexible printed wiring board and may be a single-sided flexible printed wiring board having one conductor layer or a multilayer flexible printed wiring board having three conductor layers or more.

What is claimed is:

1. An optical and electrical mixed flexible printed wiring board, comprising:
    a flexible printed wiring board body having at least one layer of a conductive layer and a flexible insulating layer and an optical waveguide bonded to the flexible printed wiring board body via an adhesive,
    wherein
    the optical waveguide includes at least one flexible optical waveguide core having at least two optical input/output portions and a flexible optical waveguide cladding at least in contact with the optical waveguide core,
    a light emitting device and a light receiving device are mounted on the flexible printed wiring board body and light from a light emitting portion of the light emitting device is transmitted to a light receiving portion through the optical waveguide,
    the light emitting device and the light receiving device are in a bare chip form and are a light emitting device of surface emitting type and a light receiving device of surface receiving type having an electrode on an opposite surface of the light emitting portion and the light receiving portion respectively, and
    the light emitting device, the light receiving device, and the optical waveguide are mounted on one surface of the flexible printed wiring board body, the light emitting portion of the light emitting device, the optical waveguide core, and the light receiving portion of the light receiving device are arranged substantially coaxially, and the light emitting device and the light receiving device are mounted in such a way that a light emitting/receiving direction is substantially parallel to the surface of the flexible printed wiring board body.

2. The optical and electrical mixed flexible printed wiring board according to claim 1, wherein
    each electrode of the light emitting device and the light receiving device is arranged closer to a fixed surface side of the light emitting device and the light receiving device to be a bottom side when mounted on the flexible printed wiring board body.

3. The optical and electrical mixed flexible printed wiring board according to claim 1, wherein
    the light emitting portion of the light emitting device and a light input portion of the optical waveguide, and the light receiving portion of the light receiving device and a light output portion of the optical waveguide are each sealed by an integral sealing resin.

4. A method of mounting a light emitting device and a light receiving device on the optical and electrical mixed flexible printed wiring board according to claim 1, comprising:
    if the light emitting device and the light receiving device are denoted as a light emitting/receiving device and a light emitting portion and a light receiving portion of the light emitting device and the light receiving device are denoted as a light emitting/receiving portion of the light emitting/receiving device, recognizing the light emitting/receiving device to be picked up by a first camera from many light emitting/receiving devices placed with the light emitting/receiving portion being directed upward;
    gripping two opposed end faces of four end faces at right angles to a light emitting/receiving surface on which the light emitting/receiving portion is provided of the recognized light emitting/receiving device to be picked up by a pickup tool and moving the light emitting/receiving device into a mounting apparatus;
    rotating the pickup tool by 90°, sucking and holding a surface on an opposite side of the light emitting/receiving surface of the rotated light emitting/receiving device by a suction unit, directing a light emitting/receiving direction of the light emitting/receiving portion in a horizontal direction, and directing a bottom fixed surface of the four end faces of the light emitting/receiving device downward while the bottom fixed surface protruding from a suction holding portion of the suction unit; and
    recognizing an outer shape of the light emitting/receiving device sucked and held by the suction unit by a second camera, moving the light emitting/receiving device to a mounting stage, and mounting the light emitting/receiving device by fixing a fixing surface to the flexible printed wiring board body in such a way that the light emitting/receiving direction is substantially parallel to the surface of the flexible printed wiring board body.

* * * * *